US006739507B2

(12) United States Patent
Kudyba

(10) Patent No.: US 6,739,507 B2
(45) Date of Patent: May 25, 2004

(54) METHOD OF AUTOMATED RAIL LOADING OF AUTOMOTIVE VEHICLES

(75) Inventor: Victor Joseph Kudyba, Northville, MI (US)

(73) Assignee: Ford Motor Company, Dearborn, MI (US)

( * ) Notice: Subject to any disclaimer, the term of this patent is extended or adjusted under 35 U.S.C. 154(b) by 159 days.

(21) Appl. No.: 09/682,669

(22) Filed: Oct. 4, 2001

(65) Prior Publication Data

US 2003/0066885 A1 Apr. 10, 2003

(51) Int. Cl.[7] .............................................. G07B 15/02
(52) U.S. Cl. ...................... 235/384; 235/385; 700/217; 705/8; 340/825.28
(58) Field of Search ................................. 235/384, 375, 235/383, 385, 376; 700/213, 217, 225, 226; 705/8, 13; 701/19; 340/10.33, 7.2, 426.14, 988, 989, 426.22, 426.23, 825.28, 825.29; 375/361; 436/56

(56) References Cited

U.S. PATENT DOCUMENTS

| | | | | |
|---|---|---|---|---|
| 4,652,528 A | * | 3/1987 | Domkowski | ................. 436/56 |
| 5,635,693 A | * | 6/1997 | Benson et al. | ............... 235/384 |
| 5,801,618 A | * | 9/1998 | Jenkins | ................... 340/426.14 |
| 5,936,527 A | | 8/1999 | Isaacman et al. | ........ 340/572.1 |
| 6,056,199 A | | 5/2000 | Wiklof et al. | ........... 235/462.45 |
| 6,064,705 A | * | 5/2000 | Zalud et al. | ................. 375/361 |
| 6,163,278 A | * | 12/2000 | Janman | ...................... 340/7.2 |
| 6,427,913 B1 | * | 8/2002 | Maloney | ..................... 235/383 |
| 2002/0052772 A1 | * | 5/2002 | Nishimoto et al. | ............ 705/8 |
| 2002/0082893 A1 | * | 6/2002 | Barts et al. | ..................... 705/8 |

FOREIGN PATENT DOCUMENTS

| | | | |
|---|---|---|---|
| JP | 5-221352 A | * | 8/1993 |
| WO | WO 99-36798 | | 7/1999 |
| WO | WO 00-03352 | | 1/2000 |

* cited by examiner

Primary Examiner—Jared J. Fureman
(74) Attorney, Agent, or Firm—David B. Kelley

(57) ABSTRACT

A method is provided of automated rail loading of automotive vehicles. The method includes the steps of attaching tags to the automotive vehicles and performing an automated railcar identification. The method also includes the step of generating an automated load makeup based on the identified railcar and the automotive vehicles. The method includes the step of locating the automotive vehicles and loading the automotive vehicles on a railcar specified in the automated load makeup. The method further includes the step of shipping the automotive vehicles via the railcar to a final destination specified in the automated load makeup.

19 Claims, 1 Drawing Sheet

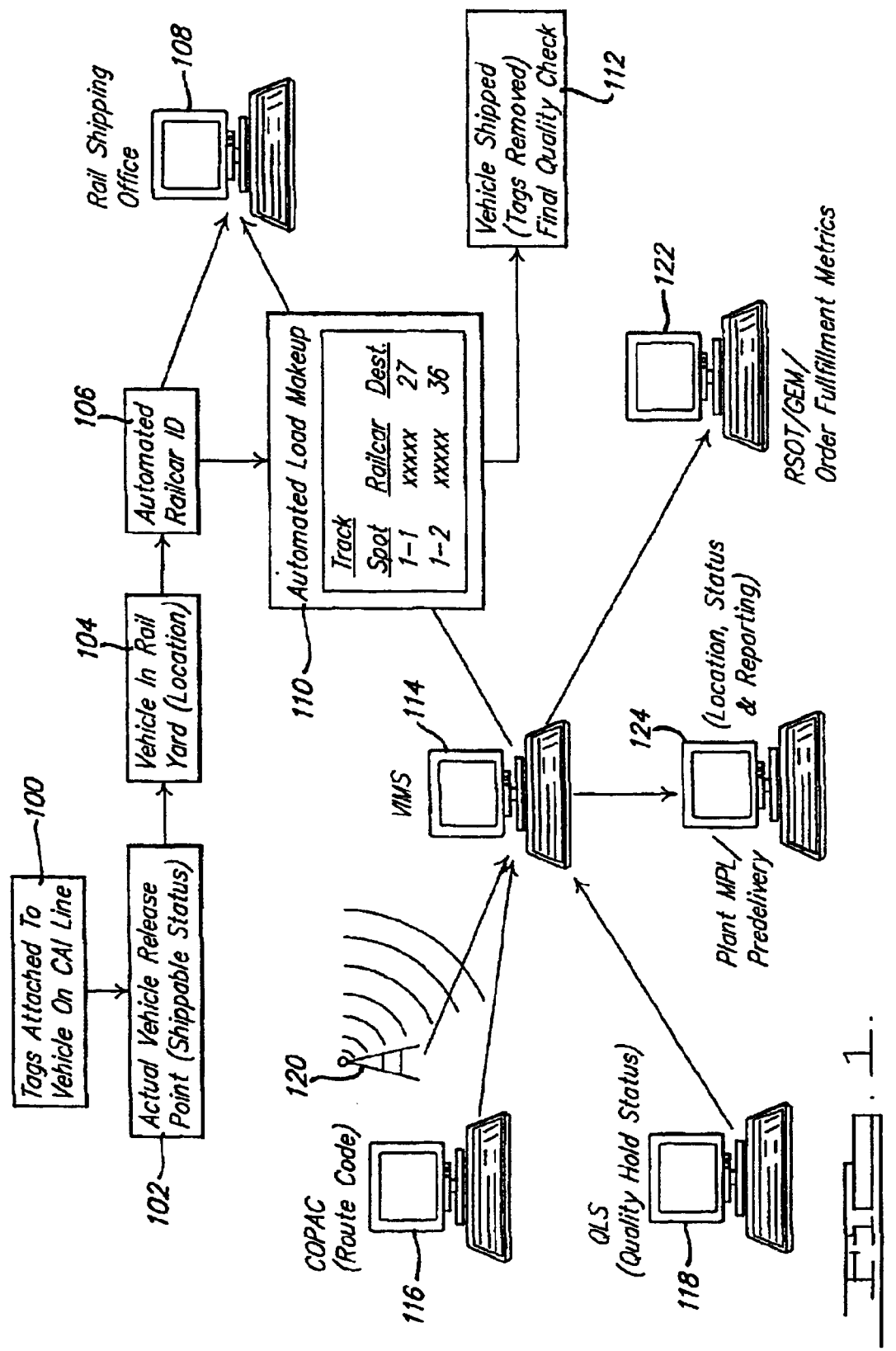

METHOD OF AUTOMATED RAIL LOADING OF AUTOMOTIVE VEHICLES

BACKGROUND OF INVENTION

The present invention relates generally to rail loading of automotive vehicles and, more specifically, to a method of automated rail loading of automotive vehicles.

It is known to load automotive vehicles on railcars for shipment from one destination to another. Currently, a rail loading process is used to load the automotive vehicles on the railcars at one location and move the railcars along rail tracks to another location. The rail loading process includes driving automotive vehicles by an operator to a release pad in a rail yard and shuttling the automotive vehicles by a shuttle crew from the release pad to a load lane. The rail loading process also includes searching the rail yard for full loads of the automotive vehicles by an operator and, upon finding full loads of the automotive vehicles, manually scanning vehicle identification numbers (VINs) of the automotive vehicles with scanner guns and writing a track/spot on a window of the automotive vehicles. The rail loading process includes downloading the scanner guns by load number to verify units of the automotive vehicles to a particular destination.

In the current rail loading process, railcars are switched into an automotive vehicle manufacturer assembly plant's rail yard facility by various rail carriers. The rail loading process includes walking up and down the individual rail tracks by a rail shipping office personnel, manually writing down railcar numbers by the personnel on a paper track set sheet. The track set sheet contains railcar identification numbers, which are a ten-digit number, and the track and the spot on the track that the railcar is located on. The rail loading process includes manually entering the ten-digit railcar number into a rail start of trip (RSOT) computer system. After a full railcar load of automotive vehicles is identified for one destination, the rail loading process includes assigning a railcar number to the load number by the personnel. The rail loading process includes manually making up a load sheet by the operator to provide a loading crew with instructions to load a specific load number on a specific railcar number. The rail loading process includes locating automotive vehicles by the loading crew and loading or driving the load of automotive vehicles onto the railcar. The rail loading process further includes updating a centralized outbound pinpoint and control (COPAC) computer system by the operator, which updates the rail carrier with the railcar number and destination.

As a result, the current rail loading process is a labor-intensive process that lends itself to errors in assigning vehicles to railcars and in recording the railcar numbers. This process suffers from the disadvantage that a relatively large amount of time is needed to makeup rail loads. This process also suffers from the disadvantage that it requires relatively large automotive vehicle inventories and resources, which are inefficiently used.

As a result, it is desirable to provide a method of automated rail loading of automotive vehicles. It is also desirable to provide a method that reduces the time needed to makeup rail loads of automotive vehicles to destination ramps and improves accuracy of the process. It is further desirable to provide a computerized method that can be used for automated rail loading of automotive vehicles that reduces vehicle plant inventory.

SUMMARY OF INVENTION

Accordingly, the present invention is a method of automated rail loading of automotive vehicles. The method includes the steps of attaching tags to the automotive vehicles and performing an automated railcar identification. The method also includes the step of generating an automated load makeup based on the identified railcar and the automotive vehicles. The method includes the step of locating the automotive vehicles and loading the automotive vehicles on a railcar specified in the automated load makeup. The method further includes the step of shipping the automotive vehicles via the railcar to a final destination specified in the automated load makeup.

One advantage of the present invention is that a method is provided of automated rail loading of automotive vehicles. Another advantage of the present invention is that the method reduces the time needed to makeup rail loads of automotive vehicles to destination rail ramps. Yet another advantage of the present invention is that the method improves the accuracy of the process by eliminating vehicle and railcar misshipments due to error in writing the railcar number on the track sheet, entering the railcar number in RSOT, and the reversal of the railcars by location on the track. Still another advantage of the present invention is that the method reduces vehicle plant inventory by reducing vehicle plant dwell time. A further advantage of the present invention is that the method is less labor intensive and greatly reduces the time to identify and gather railcar numbers. Yet a further advantage of the present invention is that the method reduces errors in assigning automotive vehicles to railcars and in recording the railcar numbers. Still a further advantage of the present invention is that the method provides online identification and location of all railcars in an automotive vehicle manufacturer assembly plant rail yard. Another advantage of the present invention is that the method provides the ability to accurately identify railcar identification numbers by track and spot. Yet another advantage of the present invention is that the method reduces cost due to lost sales, late charges, and personnel.

Other features and advantages of the present invention will be readily appreciated, as the same becomes better understood, after reading the subsequent description taken in conjunction with the accompanying drawings.

BRIEF DESCRIPTION OF DRAWINGS

FIG. 1 is a flowchart of a method, according to the present invention, of automated rail loading of automotive vehicles.

DETAILED DESCRIPTION

Referring to the drawings and in particular FIG. 1, one embodiment of a method, according to the present invention, of automated rail loading of automotive vehicles is shown. The method is to be carried out on a computer system that includes a computer having a memory, a processor, a display and user input mechanism, such as a mouse or keyboard. It should be appreciated that the computer system is conventional and known in the art.

The method is used for automated rail loading of automotive vehicles by capturing the railcar numbers electronically by track and spot on the rail track. In the present invention, the method starts in block 100 with attaching tags to automotive vehicles on a customer acceptance inspection (CAI) line of an automotive vehicle manufacturer. For example, an operator attaches active radio frequency (RF) tags to the automotive vehicles on the CAI line of the automotive vehicle manufacturer during an assembly process of the automotive vehicles. It should be appreciated that the RF tags are commercially available and known in the art.

Once the tags are attached to the automotive vehicles, the method advances to block 102 and moves the tagged automotive vehicles by the operator to an actual vehicle release point. In one embodiment, the actual vehicle release point is the shippable status of the automotive vehicle and is a fence between an automotive vehicle assembly plant and a rail yard and is the actual sale of the automotive vehicle for the automotive vehicle manufacturer. After block 102, the method advances to block 104 and moves the tagged automotive vehicles by the operator into load lanes in the rail yard. It should be appreciated that moving the vehicles into load lanes in the rail yard is conventional and known in the art.

Once the automotive vehicles are moved in the rail yard, the method advances to block 106. In block 106, the method performs automated railcar identification. The railcars are automatically identified by RF tags on the railcars, which are inputted into a computer system 108. The RF tags provide input as to which railcars are on which rail tracks and spots. For example, the method identifies the railcar numbers electronically by fixed RF scanners that read the RF tags on the railcars. This data, regarding railcar numbers, is fed into a computer system 108 in a rail shipping office. It should be appreciated that the method provides for scanned RF tags on the railcars and automates the collection of the railcar identification numbers by utilizing fixed tag readers installed at the entrance of each loading track that will read the RF tags currently attached to all automotive vehicle manufacturer assigned railcars.

After block 106, the method advances to block 110 and performs an automated load makeup of the tagged automotive vehicles. The automated load makeup is a real time on-line inventory of automotive vehicles with the railcars. For example, the full loads of automotive vehicles are electronically read by RF antennas installed in the rail shipping yard, which will read the RF tags placed on the automotive vehicles. This data is fed to the computer system 108 in the rail shipping office and allows for on-line real time load makeup that will inform the rail loading function of the number of full loads available for shipment and where the full loads are located and the order in which to load the railcars is be based on a loading algorithm, which minimizes the number of switches required by the rail carriers. The automated load makeup is a report of rail track spot, railcar number, number of automotive vehicles to be loaded on the railcar, and destination route code. After block 110, the method advances to block 112 and removes the RF tags by the operator and ships the automotive vehicles by the railcars to their final destination. The method performs a final quality check on the automotive vehicles at a final scan of the VINs of the automotive vehicles prior to loading the automotive vehicles onto the railcar. The method then ends. It should be appreciated that the RF tags on the automotive vehicles are removed before the automotive vehicles are moved or loaded onto the railcars. It should also be appreciated that the method utilizes fixed scanners mounted at the entrance of each track and the method provides for accurate real-time on-line inventory of the railcar numbers, track and spot location, and type of railcar needed to identify a load ratio factor for each railcar for the rail loading office.

For the method, the automated load makeup is outputted by a computer system 114 known as a vehicle inventory management system (VIMS). The computer system 114 receives data such as a route code from a computer system 116 known as centralized outbound pinpoint and control (COPAC). The computer system 114 receives data such as quality hold status from a computer system 118 known as a quality leasing system (QLS). The computer system 114 also receives data such as the full loads of automotive vehicles that are electronically read by RF antennas 120 installed in the rail shipping yard. The computer system 114 outputs the automated load makeup to the computer system 108 in the rail shipping office. The computer system 114 also outputs data on the released automotive vehicles to a computer system 122 known as a rail start of trip (RSOT)/global enterprise metrics (GEM)/order fulfillment metrics. The computer system 114 further outputs data such as location, status, and reporting of automotive vehicles to a computer system 124 known as a plant materials planning lending/predelivery. The computer system 124 checks for quality once the automotive vehicles are off the CAI line previously described. It should be appreciated that the automotive vehicles are driven to a release pad in the rail yard and shuttled by a shuttle crew from the release pad to a load lane after the automotive vehicles are tagged on the CAI line.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of automated rail loading of automotive vehicles, said method comprising the steps of:
  attaching tags to the automotive vehicles;
  performing an automated railcar identification; and
  generating an automated load makeup based on the identified railcar and the automotive vehicles; and
  locating the automotive vehicles and loading the automotive vehicles on a railcar specified in the automated load makeup; and
  shipping the automotive vehicles via the railcar to a final destination specified in the automated load makeup.

2. A method as set forth in claim 1 wherein said step of performing automated railcar identification comprises scanning an identification number of a railcar.

3. A method as set forth in claim 1 including the step of performing automated automotive vehicle identification.

4. A method as set forth in claim 3 wherein said step of performing automated vehicle identification comprises electronically reading the tags on the automotive vehicles by radio frequency (RF) antennas installed in a rail shipping yard.

5. A method as set forth in claim 1 including the step of moving the tagged automotive vehicles to a vehicle release point adjacent to a rail yard.

6. A method as set forth in claim 5 including the step of moving the tagged automotive vehicles in the rail yard.

7. A method as set forth in claim 1 wherein said automated load makeup comprises a track spot, railcar number, number of automotive vehicles to be loaded on railcar, and destination route code.

8. A method as set forth in claim 1 including the step of performing a final quality check on the automotive vehicles just prior to loading the automotive vehicles onto the railcar.

9. A method as set forth in claim 1 wherein said step of attaching comprises attaching active radio frequency (RF) tags to the automotive vehicles.

10. A method of automated rail loading of automotive vehicles, said method comprising the steps of:
  attaching tags to the automotive vehicles;
  performing an automated railcar identification;
  generating an automated load makeup based on the identified railcar and the automotive vehicles;

locating the automotive vehicles and loading the automotive vehicles on a railcar specified in the automated load makeup;

removing the attached tags from the automotive vehicles; and shipping the automotive vehicles via the railcar to a final destination specified in the automated load makeup.

11. A computerized method of automated rail loading of automotive vehicles, said method comprising the steps of:

attaching radio frequency (RF) tags to the automotive vehicles;

performing automated automotive vehicle identification;

performing an automated railcar identification;

generating an automated load makeup based on the identified railcar and the identified automotive vehicles;

locating the automotive vehicles and loading the automotive vehicles on a railcar specified in the automated load makeup; and shipping the automotive vehicles via the railcar to a final destination specified in the automated load makeup.

12. A computerized method as set forth in claim 11 wherein said step of performing automated railcar identification comprises scanning an identification number of a railcar.

13. A computerized method as set forth in claim 11 wherein said step of performing automated vehicle identification comprises electronically reading the tags on the automotive vehicles by radio frequency (RF) antennas installed in a rail shipping yard.

14. A computerized method as set forth in claim 11 including the step of moving the tagged automotive vehicles to a vehicle release point adjacent to a rail yard.

15. A computerized method as set forth in claim 11 including the step of moving the tagged automotive vehicles in a rail yard.

16. A computerized method as set forth in claim 11 wherein said automated load makeup comprises a track spot, railcar number, number of automotive vehicles to be loaded on railcar, and destination route code.

17. A computerized method as set forth in claim 11 including the step of performing a final quality check on the automotive vehicles just prior to loading the automotive vehicles onto the railcar.

18. A computerized method of automated rail loading of automotive vehicles, said method comprising the steps of:

attaching tags to the automotive vehicles;

performing automated automotive vehicle identification;

performing an automated railcar identification;

generating an automated load makeup based on the identified railcar and the identified automotive vehicles;

locating the automotive vehicles and loading the automotive vehicles on a railcar specified in the automated load makeup;

removing the attached tags from the automotive vehicles; and shipping the automotive vehicles via the railcar to a final destination specified in the automated load makeup.

19. A method of automated rail loading of automotive vehicles, said method comprising the steps of:

attaching radio frequency (RF) tags to the automotive vehicles;

moving the tagged automotive vehicles to a vehicle release point adjacent to a rail yard;

moving the tagged automotive vehicles from the vehicle release point into load lanes in the rail yard;

performing automated automotive vehicle identification;

performing an automated railcar identification;

generating an automated load makeup comprising a track spot, railcar number, number of vehicles to be loaded on railcar, and destination route code based on the identified railcar and the identified automotive vehicles;

locating the automotive vehicles and loading the automotive vehicles on a railcar specified in the automated load makeup;

removing the attached tags from the automotive vehicles; and shipping the automotive vehicles via the railcar to a final destination specified in the automated load makeup.

* * * * *